United States Patent
Petrus

(10) Patent No.: US 7,460,835 B1
(45) Date of Patent: Dec. 2, 2008

(54) METHOD AND APPARATUS FOR DETERMINING AN OPERATING CONDITION IN A COMMUNICATIONS SYSTEM

(75) Inventor: Paul Petrus, Santa Clara, CA (US)

(73) Assignee: ArrayComm LLC, San Jose, CA (US)

( * ) Notice: Subject to any disclaimer, the term of this patent is extended or adjusted under 35 U.S.C. 154(b) by 1712 days.

(21) Appl. No.: 09/668,664

(22) Filed: Sep. 22, 2000

(51) Int. Cl.
- H04B 17/00 (2006.01)
- H04B 15/00 (2006.01)
- H04B 17/02 (2006.01)

(52) U.S. Cl. .................................. 455/67.11; 455/63.4

(58) Field of Classification Search ................. 455/501, 455/63, 561, 562, 226.3, 226.2, 279.1, 135, 455/63.1, 63.4, 67.11, 562.1, 65
See application file for complete search history.

(56) References Cited

U.S. PATENT DOCUMENTS

| | | | | |
|---|---|---|---|---|
| 5,886,988 A | * | 3/1999 | Yun et al. | 370/329 |
| 5,914,946 A | * | 6/1999 | Avidor et al. | 370/336 |
| 5,999,826 A | * | 12/1999 | Whinnett | 455/562 |
| 6,009,124 A | | 12/1999 | Smith et al. | |
| 6,018,643 A | * | 1/2000 | Golemon et al. | 455/562 |
| 6,122,260 A | | 9/2000 | Liu et al. | |
| 6,141,567 A | * | 10/2000 | Youssefmir et al. | 375/349 |
| 6,167,039 A | * | 12/2000 | Karlsson et al. | 370/320 |
| 6,185,440 B1 | * | 2/2001 | Barratt et al. | 370/334 |
| 6,285,891 B1 | * | 9/2001 | Hoshino | 455/567 |
| 6,411,257 B1 | * | 6/2002 | Sorelius et al. | 342/378 |

FOREIGN PATENT DOCUMENTS

| | | |
|---|---|---|
| GB | 2 349 045 A | 10/2000 |
| WO | WO 93/22881 | 11/1993 |
| WO | WO 00/07302 | 2/2000 |
| WO | WO-00 35116 | 6/2000 |
| WO | WO-00 35129 | 6/2000 |

OTHER PUBLICATIONS

G. Xu and H. Lui, "An effective transmission beamforming scheme for frequency division duplex digital wireless communications systems", in *Proc. of ICASSP*, 1995, pp. 1729-1732.

(Continued)

*Primary Examiner*—Duc Nguyen
*Assistant Examiner*—Michael T Thier
(74) *Attorney, Agent, or Firm*—Blakely, Sokoloff, Taylor & Zafman LLP

(57) ABSTRACT

A communication system environment estimation apparatus and method. In one embodiment, an environment estimation apparatus according to the teachings of the present invention includes a plurality of antenna elements and a receiver coupled to receive uplink signals from the plurality of antenna elements. The apparatus also includes a signal processor coupled to receive the uplink signals to select an estimation of an environment responsive to the uplink signals received from the plurality of antenna elements.

15 Claims, 8 Drawing Sheets

OTHER PUBLICATIONS

D. Gerlach and A. Paulraj, "Base station transmitting antenna arrays with mobile to base feedback," in *Proc. of IEEE Asilomar Conf.*, Nov. 1993, pp. 1432-1436.

M. Rias, "Direction of arrival estimation using antenna arrays", in *Masters Thesis*, Jan. 1996, Virginia Tech, VA., pp. 64-71.

A. Paulraj, R. Roy, and T. Kailtath, "A subspace rotation approach to signal parameter estimation", in *Proc. IEEE*, Jul. 1986, vol. 74(7) pp. 1044-1045.

PCT International Search Report for International Application No. PCT/US01/31123, International Searching Authority, European Patent Office, Mar. 5, 2002.

PCT International Search Report for International Application No. PCT/US 01/29499, International Searching Authority, European Patent Office, May 31, 2002.

Woodward G et al: "Outdoor Indoor Temporal & Spatial Wideband Channel Model For ISM Bands" VTC 1999-Fall. IEEE VTS 50th. Vehicular Technology Conference. Gateway to the 21st Century Communications Village. Amsterdam, Sep. 19-22, 1999, IEEE Vehicular Technology Conference, New York, NY: IEEE, US, vol. 1 conf. 50, Sep. 1999, pp. 136-140.

PCT/US01/29499 International Search Report (Oct. 23, 2002).

* cited by examiner

“METHOD AND APPARATUS FOR
DETERMINING AN OPERATING
CONDITION IN A COMMUNICATIONS
SYSTEM

BACKGROUND OF THE INVENTION

1. Field of the Invention

The present invention relates generally to communications systems and, more specifically, the present invention relates to wireless communications systems employing antenna arrays.

2. Background Information

Antenna arrays may be used in communications systems that transmit and/or receive radio frequency signals. Antenna arrays typically include a number of antennas that are spatially separated and may be employed in a number of different wireless applications including radio communications systems, cellular systems, television broadcasting, point to point systems, paging systems, medical applications or the like.

The use of antenna arrays in such systems often provide antenna performance improvements over the use of a single element antenna. These antenna performance improvements may include for received signals improved signal to noise ratio and interference rejection. Antenna performance improvements for transmitted signals may include improved directionality and hence less power towards other co-channel users, security and reduced transmit power requirements. Antenna arrays may be used for signal reception only, for signal transmission or for both signal reception and transmission.

A typical application of antenna array systems is in a wireless communication system. Examples include a cellular communication system and a wireless local loop system. Such wireless communications systems typically include one or more communications stations, generally called based stations, each communicating with its subscriber units, also called remote terminals and handsets. In cellular systems, the remote terminal is typically mobile, while in wireless local loop systems, the remote unit is typically in a fixed location.

The antenna array is typically at the base station, but may also be employed at a user terminal. Communication from the remote terminal to the base station is typically called the uplink and communication from the base station to the remote terminal is typically called the downlink. In time division duplex (TDD) systems, uplink and downlink communications with a particular remote terminal occur at the same frequency, but at different time slots. In frequency division duplex (FDD) systems, uplink and downlink communications with a particular remote terminal occur at different frequencies and may or may not occur at the same time.

Since different frequencies are used in the uplink and downlink communication channels in FDD, the behavior of the signals in the uplink and downlink communication channels between the base station and remote terminal are different. The differences are more apparent as the channels have more multipath components. In a multipath environment, scattering and/or reflections caused by, for example, buildings or the like result in amplitude and phase changes and/or multipath components in the communication signals. Multipath components behave differently for different frequencies and a communication signal arriving at an antenna array changes with the frequency. Accordingly, the performance of a wireless communications system is impacted by the presence of scatterers in the environment.

Another factor that impacts wireless communication system performance is the presence of multiple remote terminals utilizing the same frequency or channel at the same time in the environment. As the number of separate sources or remote terminals utilizing the same frequency increases, the amount of interference in the communications channel also increases.

SUMMARY OF THE INVENTION

An environment estimation apparatus and method are disclosed. In one embodiment, an environment estimation apparatus includes a plurality of antenna elements and a receiver coupled to receive uplink signals from the plurality of antenna elements. The apparatus also includes a signal processor coupled to receive the uplink signals to select an estimation of an environment responsive to the uplink signals received from the plurality of antenna elements. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

In one aspect of the present invention, methods and apparatuses for determining an operating condition or environment of a communications system are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one aspect of the present invention, a base station in a wireless communication system is provided with the ability to estimate an environment or condition in which the wireless communication system is operating. In one embodiment, the base station includes an antenna array having a plurality of antenna elements. Uplink communication signals are received by the antenna elements in the antenna array and processing is performed on the uplink communication signals to estimate whether the base station is operating in a low clutter or high clutter environment. In addition, processing is performed in one embodiment on the uplink communication signals when in a high clutter environment to estimate whether the base station is operating in a low interference or high interference environment.

Figure 1:
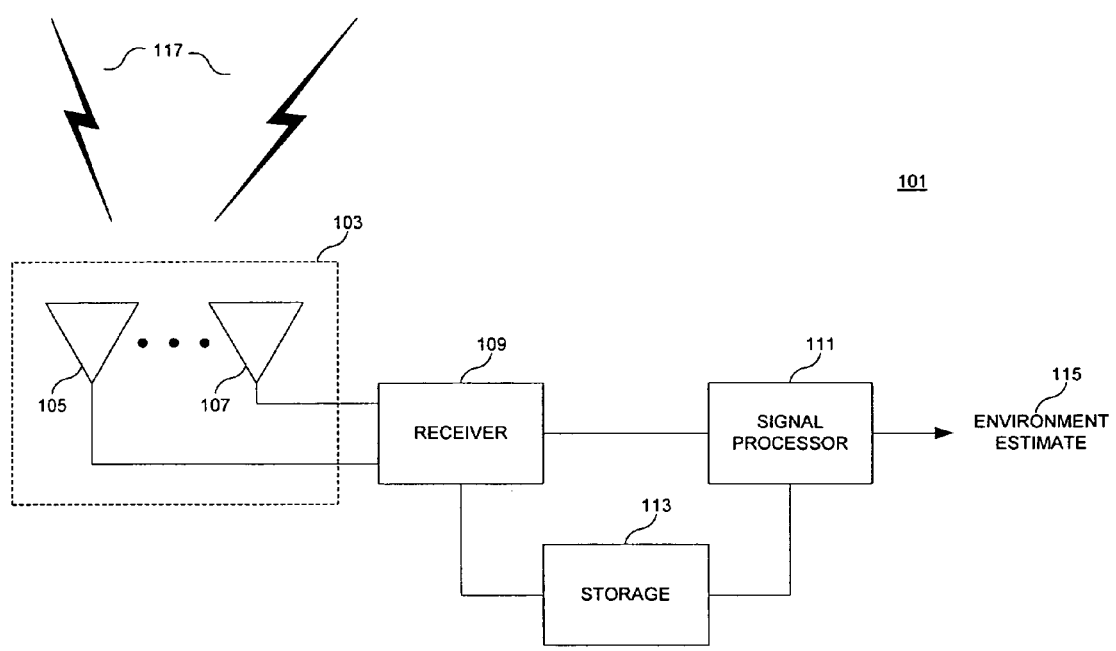
FIG. 1 is a block diagram illustration of one embodiment of a base station in accordance with the teachings of the present invention.

To illustrate, FIG. 1 is a block diagram illustration of one embodiment of a base station 101 of a wireless communication system in accordance with the teachings of the present invention. As shown, base station 101 includes an antenna array 103 having a plurality of antenna elements 105 and 107. It is appreciated that although antenna array 103 is illustrated having two antenna elements 105 and 107 in FIG. 1 for explanation purposes, antenna array 103 may include more than two antenna elements in accordance with the teachings of the present invention. As illustrated, uplink communication signals 117 are received by the antenna elements 105 and 107 of antenna array 103. In one embodiment, the uplink communication signals 117 are received from one or more remote terminals of a wireless communication system.

In the depicted embodiment, a receiver 109 is coupled to receive uplink communication signals 117 from the antenna elements 105 and 107 of antenna array 103. In one embodiment, signal processor 111 is coupled to receiver 109 to receive the uplink communication signals 117. In one embodiment, storage 113 is coupled to receiver 109 to store the uplink communication signals 117 received by receiver 109 and signal processor 111 is coupled to storage 113 to receive the stored communication signals. In one embodiment, storage 113 is a machine-readable medium on which software instructions that may be executed by signal processor 111 are stored.

As shown in the embodiment illustrated in FIG. 1, signal processor 111 processes the received uplink communication signals 117 and generates an environment estimate 115 in response to the received uplink communication signals 117. In one embodiment, environment estimate 115 may be an estimate of a low or high clutter environment and/or an estimate of a low or high interference environment.

Figure 2:
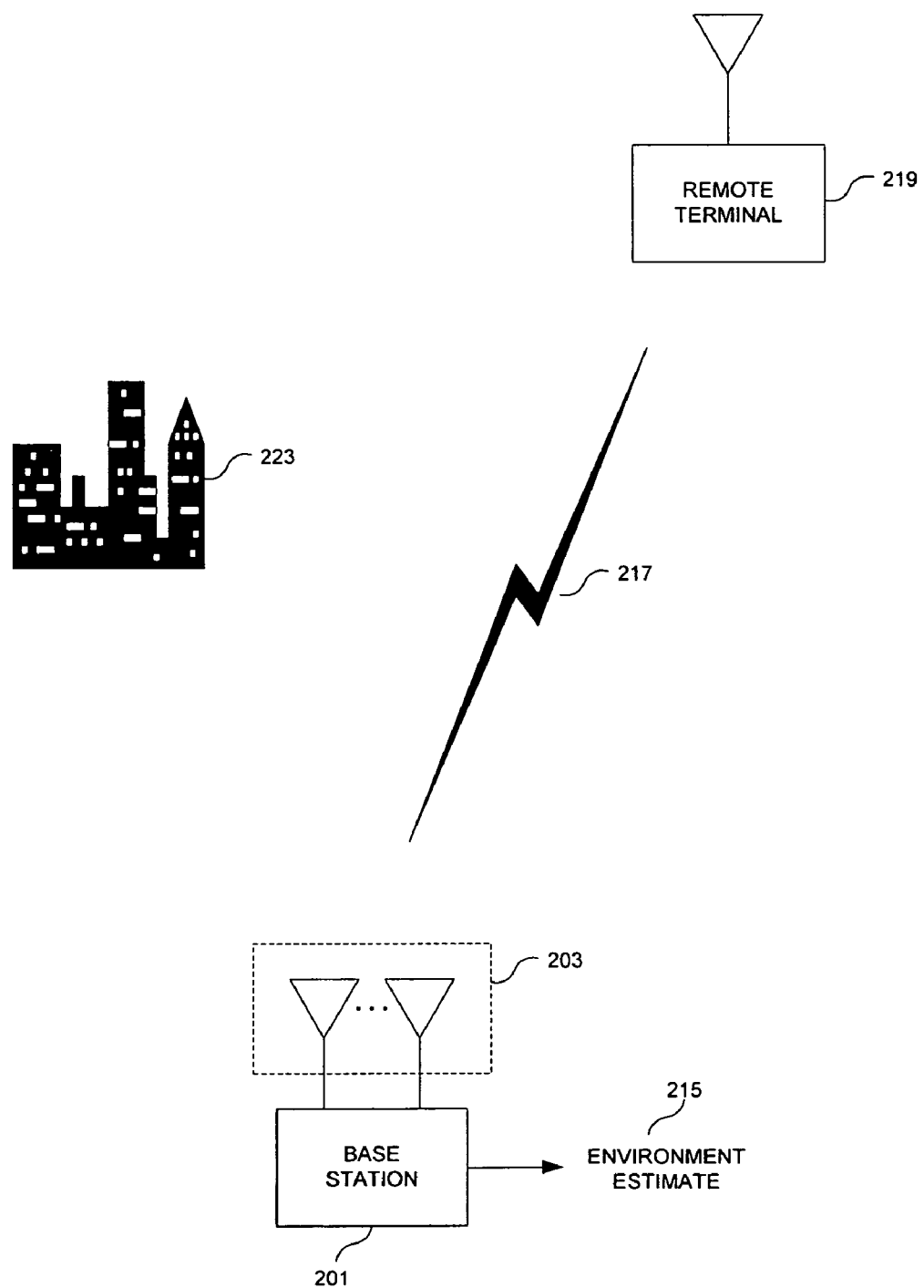
FIG. 2 is a block diagram illustration of one embodiment of a base station operating in a low clutter environment in accordance with the teachings of the present invention.

To illustrate, FIG. 2 is a block diagram illustration of one embodiment of a base station 201 operating in a low clutter environment in accordance with the teachings of the present invention. For purposes of this specification, a low clutter environment corresponds to an environment in which there are relatively few scatterers or the like, which may cause multipath components. Such an environment may be found in for example a suburban environment, which may be characterized by one or two storied buildings. In some cases, there may be a line of sight between the base station and the remote terminal.

As illustrated in FIG. 2, base station 201 includes an antenna array 203 receiving uplink communication signals 217 from remote terminal 219. In one embodiment, base station 201 may be part of a cellular base station or the like and remote terminal may be a mobile unit that is part of a cellular phone or the like. However, it should be appreciated that the present invention is not limited to any particular type of wireless application, such as for example cellular systems, but may be utilized in various types of wireless systems and applications employing antenna arrays. In one embodiment, the present invention is useful in spatial division multiple access systems (SDMA) or other types of systems in which adaptive arrays may be employed. For example, one embodiment of the present invention maybe utilized in time division duplex (TDD) or especially frequency division duplex (FDD) communication systems and/or in conjunction with other wireless architectures. Furthermore, each or a combination of the various elements of embodiments of the present invention may be implemented in hardware, software, or a combination thereof.

Referring back to FIG. 2, although there are scatterers 223 are present in the environment, there are relatively few, and therefore the environment depicted in FIG. 2 is an illustration of a low clutter environment. From a propagation point of view, the communication channel between base station 201 and remote terminal 219 is benign. In one embodiment, base station 201 receives uplink communication signals 217 through antenna array 203. Base station 201 processes the uplink signals 217 and generates an environment estimate 215, which in FIG. 2 is an estimate of a low clutter environment.

Figure 3:
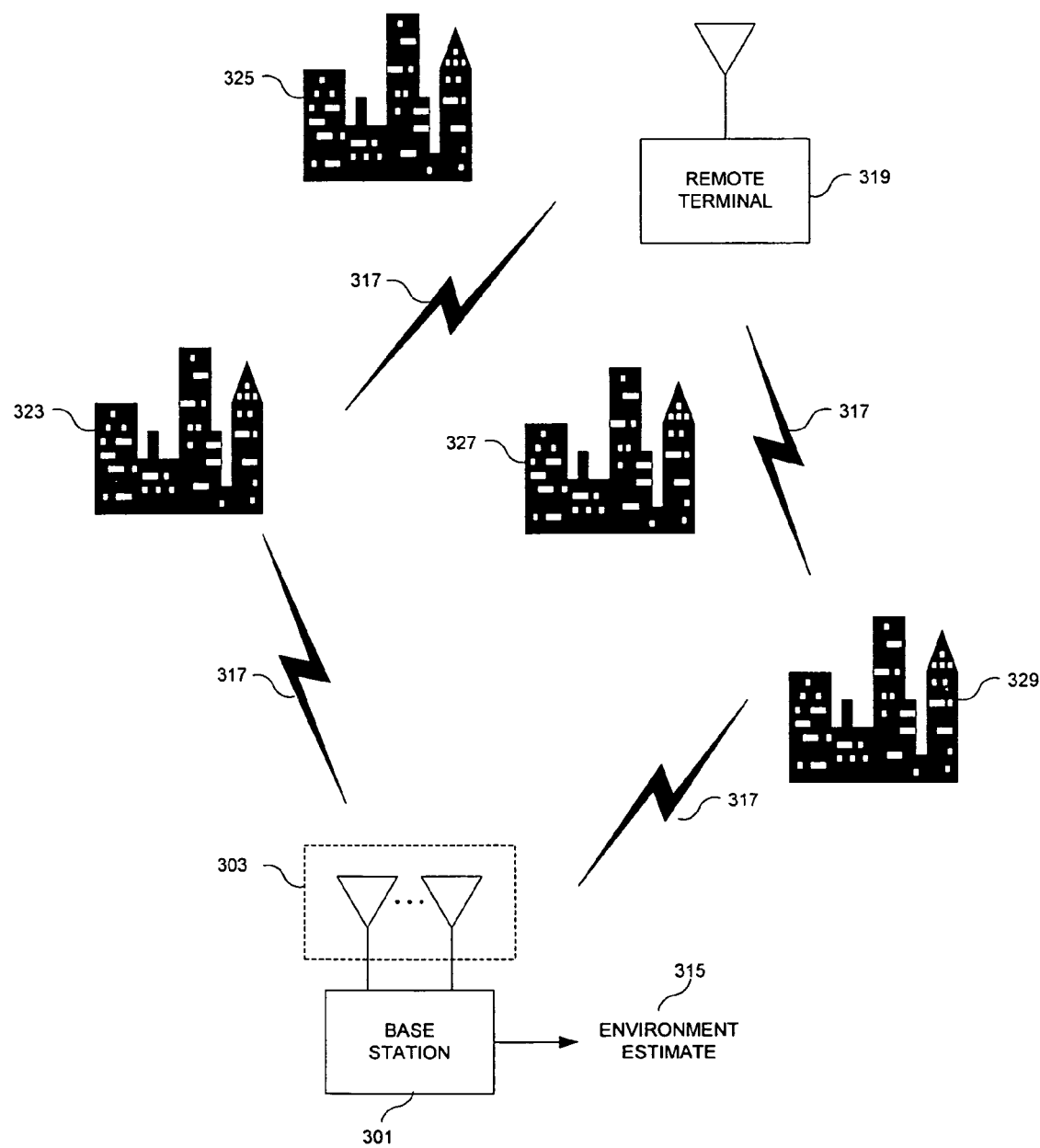
FIG. 3 is a block diagram illustration of one embodiment of a base station operating in a high clutter and low interference environment in accordance with the teachings of the present invention.

FIG. 3 is a block diagram illustration of one embodiment of a base station 301 operating in a high clutter and low interference environment in accordance with the teachings of the present invention. For purposes of this specification, a high clutter environment corresponds to an environment in which there is a relatively large amount of scatterers or the like, which may cause multipath components. One example of such an environment may be an urban environment, which may be characterized by tall buildings and the propagation environment is relatively harsh. Line of sight propagation conditions are generally absent in high clutter environments. Urban or high clutter environment propagation channels usually include multiple propagation paths and do not include a dominant path, as in suburban environments. Accordingly, there is typically a significant angle of arrival spread of incoming uplink signals in high clutter environments. For purposes of this specification, a low interference environment corresponds to an environment in which there are relatively few sources or remote terminals utilizing the same frequency or channel at the same time.

As illustrated in FIG. 3, base station 301 includes an antenna array 303 receiving uplink communication signals 317 from remote terminal 319. As shown in FIG. 3, there are a relatively large number of scatterers present, including scatterers 323, 325, 327 and 329. The relatively large number of scatterers introduce many multipath components in the uplink communication signals 317. Accordingly, the environment illustrated in FIG. 3 is a high clutter environment. In addition, the example illustrated in FIG. 3 shows relatively few remote terminals, one of which is illustrated with remote terminal 319, and therefore the depicted environment is an example of a low interference environment.

In one embodiment, base station 301 receives uplink communication signals 317 through antenna array 303. Base station 301 processes the uplink signals 317 and generates an environment estimate 315, which in FIG. 3 is an estimate of a high clutter environment. In one embodiment, if a high clutter environment is estimated, an estimation of whether the environment is low or high interference is provided. In the embodiment depicted in FIG. 3, environmental estimate 315 includes an estimate of a low interference environment.

Figure 4:
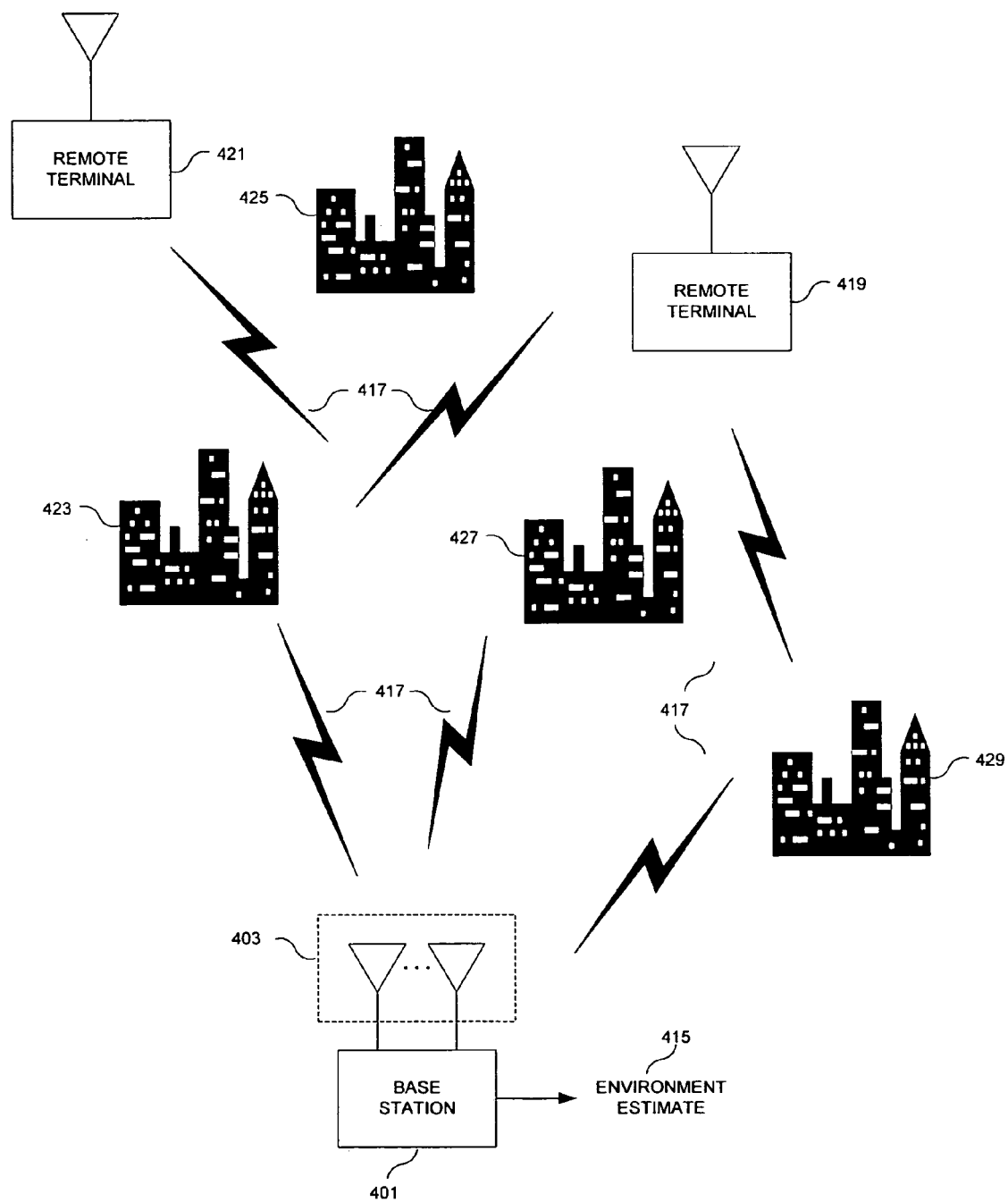
FIG. 4 is a block diagram illustration of one embodiment of a base station operating in a high clutter and high interference environment in accordance with the teachings of the present invention.

FIG. 4 is a block diagram illustration of one embodiment of a base station 401 operating in a high clutter and high interference environment in accordance with the teachings of the present invention. For purposes of this specification, a high interference environment corresponds to an environment in which there is a relatively large number of sources or remote terminals utilizing the same frequency or channel at the same time. One example of such an environment may be an environment in which there are many wireless phone users using the same channel such as for example in a busy downtown or airport environment.

As illustrated in FIG. 4, base station 401 includes an antenna array 403 receiving uplink communication signals 417 from many remote terminals, including remote terminals 419 and 421. As shown in FIG. 4, there are a relatively large number of scatterers present, including scatterers 423, 425, 427 and 429. The relatively large number of scatterers introduce many multipath components in the uplink communication signals 417. Accordingly, the environment illustrated in FIG. 4 is a high clutter environment. In addition, the example illustrated in FIG. 4 a relatively large number of remote terminals, two of which are illustrated with remote terminals 419 and 421, and therefore the depicted environment is an example of a high interference environment.

In one embodiment, base station 401 receives uplink communication signals 417 through antenna array 403. Base station 401 processes the uplink signals 417 and generates an environment estimate 415, which in FIG. 4 is an estimate of a high clutter and high interference environment.

Figure 5:
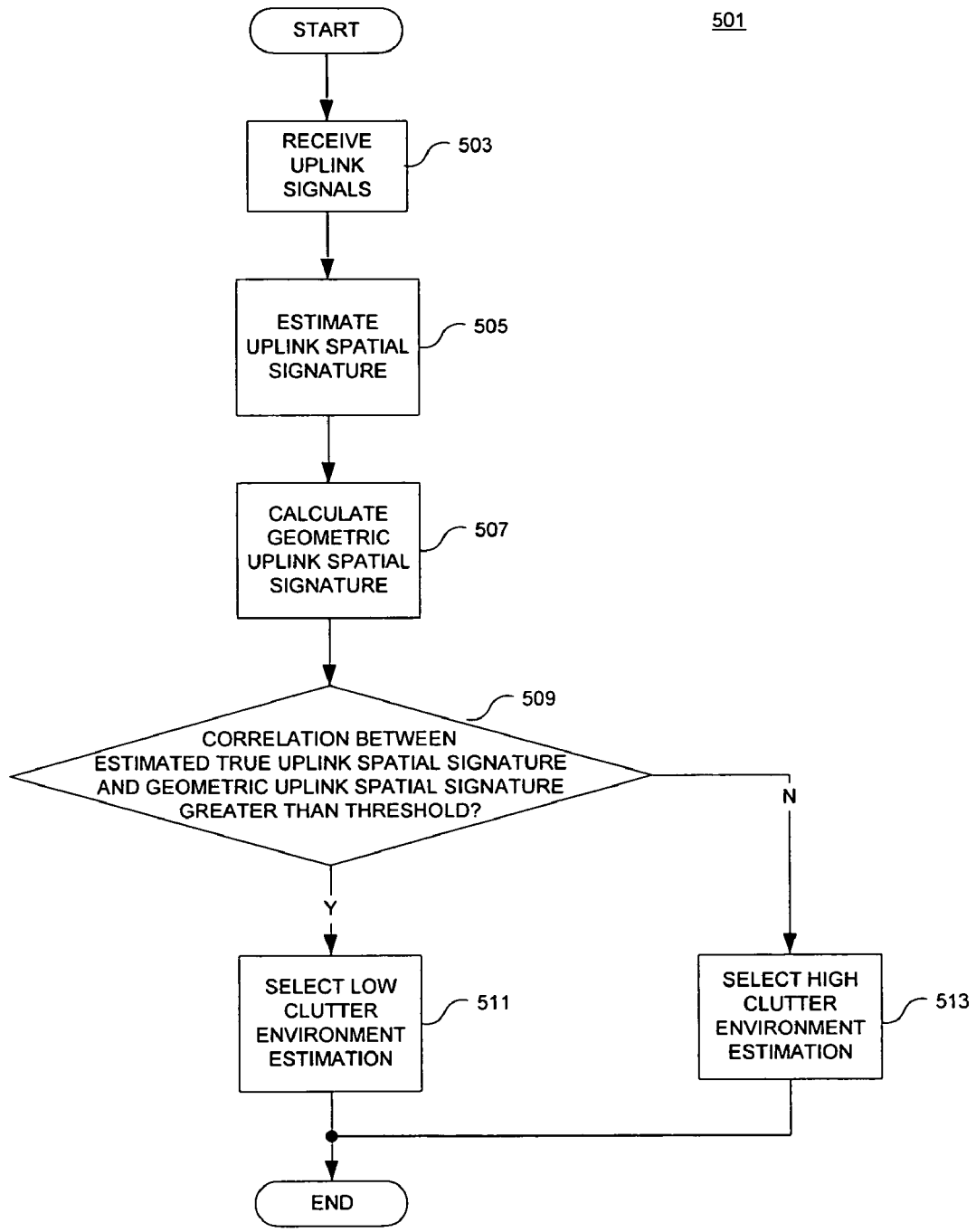
FIG. 5 is a flow diagram illustrating one embodiment a method for identifying a low or high clutter environment in accordance with the teachings of the present invention.

FIG. 5 is a flow diagram 501 illustration of one embodiment of a method for identifying a low or high clutter environment in accordance with the teachings of the present invention. The method illustrated in the flow diagram 501 of FIG. 5 may be practiced by a base station such as for example those illustrated in FIGS. 1 through 4 above. As shown in block 503, uplink signals are received by for example the plurality of antenna elements 105 and 107 of antenna array 103 of FIG. 1. In one embodiment, the uplink signals are provided to receiver 103 and are then provided to signal processor 111. In one embodiment, the uplink signals are stored in storage 113 and are then provided to signal processor 111. In another embodiment, uplink signals are received directly from receiver 109.

In one embodiment, block 505 shows that an uplink spatial signature is then estimated. As is known to those skilled in the art, $r_{zs}$ provides an estimate of the uplink signature, $\hat{a}_t$. For illustration purposes, assume that $r_{zs}$ is equal to the uplink spatial signature where $r_{zs}$ is $[Z^H s]_{M \times 1}$, a correlation vector of Z and s. Z represents a matrix representing the received uplink signal, s represents a reference signal, M is the number of elements in then antenna array and H represents a Hermitian transpose. In one example, assume that uplink communication signals include equal strength angle of arrival (AOA) components with $AOA_1=90°$ and $AOA_2=0$. It is assumed further that the antenna array includes two antenna elements such that M=2 with inter-element spacing of $\lambda/2$. Accordingly, the estimated uplink spatial signature $\hat{a}_t$ is as follows:

$$\hat{a}_t = a(AOA_1) + a(AOA_2) \quad \text{(Eq. 1)}$$

$$\hat{a}_t = e^{j\beta d \cos(AOA_1)[0:M-1]} + e^{j\beta d \cos(AOA_2)[0:M-1]} \quad \text{(Eq. 2)}$$

where $\beta 32 \ 2\pi/\lambda$, $d=\lambda/2$, $\lambda=c/f$, c=speed of light and f=carrier frequency. Using the above relationships, the estimated uplink spatial signature may be calculated for this particular example as follows:

$$\hat{a}_t = e^{(2\pi/\lambda)(\lambda/2)\cos(90°)[0:1]} + e^{j(2\pi/\lambda)(\lambda/2)\cos(0°)[0:1]} \quad \text{(Eq. 3)}$$

$$\hat{a}_t = [1\ 1] + [1\ -1] \quad \text{(Eq. 4)}$$

$$\hat{a}_t = [2\ 0] \quad \text{(Eq. 5)}$$

Continuing with the flow diagram 501 of FIG. 5, block 507 shows that in one embodiment, the geometric uplink spatial signature $\hat{a}_g$ is then calculated. In one embodiment, $\hat{a}_g$ is calculated by first estimating a dominant angle of arrival $\theta_d$. Then, the geometric uplink spatial signal $\hat{a}_g$ may be estimated according to the following:

$$\hat{a}_g = e^{j\beta \cos(\theta_d)[0:M-1]} \quad \text{(Eq. 6)}$$

In one embodiment, well-known techniques may be utilized to estimate the dominant AOA. Known AOA estimation techniques that may be utilized in accordance with the teachings of the present invention include the Delay and Sum method, Capon's method, Multiple Signal Classification (MUSIC) and Estimation of Signal Parameters via Rotational Invariance Techniques (ESPRIT).

The Delay and Sum method is also referred to as a classical beamformer method or Fourier method. The beamformer uses a weight, w, which is the spatial signatures for any given angle, $\theta$. Thus, $w=a(\theta)$. The output power of the beamformer is calculated for each azimuthal angle. The AOA corresponding to the largest output power is declared as the source AOA. This known technique produces broad beams.

Capon's known method forms a beam in the look angle, $\theta$, but it also tries to null uncorrelated interference. This is achieved by minimizing the output power subject to the constraint that a beam is formed in the direction of the look angle such that $$\min_w E[y(k)]^2 = \min_w w^H R_{zz} w \quad \text{(Eq. 7)}$$

subject to $$w^H a(\theta) = 1 \quad \text{(Eq. 8)}$$

where y is the output, w is the weight vector, H represents a Hermitian transpose and $R_{zz}$ is the input correlation matrix. The output power spectrum as a function of AOA is given by $$P_{Capon}(\theta) = 1/(a^H R_{zz} a(\theta)). \quad \text{(Eq. 9)}$$

The known MUSIC technique is a high resolution algorithm that exploits the Eigen structure of the input covariance matrix. MUSIC is a signal parameter estimation algorithm that estimates the number of incident signals, their AOAs, their strengths and the cross correlations between the incident signals. The Eigen vectors of the covariance matrix belong to either of the two orthogonal subspaces: signal subspace or noise subspace. The steering vector corresponding to the AOA of the signals lie in the signal subspace and hence orthogonal to the noise subspace. By searching through all possible array steering vectors that are perpendicular to the space spanned by the Eigen vectors of the noise subspace, the AOAs are estimated.

The known ESPRIT technique is another subspace technique that reduces the computation and storage requirements for MUSIC. ESPRIT does not require an exhaustive search or precise calibration. ESPRIT derives its advantages by utilizing array elements that have a structure that can be decomposed into two equal sized identical subarrays with corresponding elements of the two subarrays being displaced from one another by a fixed translational, not rotational, distance.

Once the dominant AOA $\theta_d$ is estimated, the geometric uplink spatial signal $\hat{a}_g$ may be calculated using the estimated dominant AOA $\theta_d$ with Equation 6 above. In one embodiment, the dominant AOA $\theta_d$ corresponds to the AOA with the highest power. Continuing with the example described above with a dominant AOA $\theta_d$ assumed to be 90°:

$$\hat{a}_g = e^{j(2\pi/\lambda)(\lambda/2)cos(90°)[0:1]} \quad \text{(Eq. 10)}$$

$$\hat{a}_g = [1\ 1] \quad \text{(Eq. 11)}$$

Continuing with the flow diagram 501 of FIG. 5, block 509 shows that in one embodiment, the correlation between the estimated true uplink spatial signature $\hat{a}_t$ and the geometric uplink spatial signature $\hat{a}_g$ is then calculated. In one embodiment, the correlation between $\hat{a}_t$ and $\hat{a}_g$ is calculated by determining the normalized dot product between estimated uplink spatial signature $\hat{a}_t$ and the geometric uplink spatial signature $\hat{a}_g$. If the correlation is greater than a low clutter threshold, then a low clutter environment estimation is selected, as shown in FIG. 5 with block 511. Otherwise, a high clutter environment estimation is selected, as shown in FIG. 5 with block 513.

To illustrate, continuing with the example described above with $\hat{a}_t = [2\ 0]$ and $\hat{a}_g = [1\ 1]$, the correlation $\rho$ is equal to the normalized dot product between $\hat{a}_t$ and $\hat{a}_g$. Accordingly, $$\rho = (\hat{a}_t^H \hat{a}_g)/(\|\hat{a}_t^H\|\|\hat{a}_g\|) \quad \text{(Eq. 12)}$$

$$\rho = 0.7071 \quad \text{(Eq. 13)}$$

Assuming that $\rho = 0.7071$ is greater than the low clutter threshold, than a low clutter threshold environment is selected. It is appreciated that the low clutter threshold is determined in one embodiment based on a number of factors including the number of antenna elements M in the antenna array.

Figure 6:
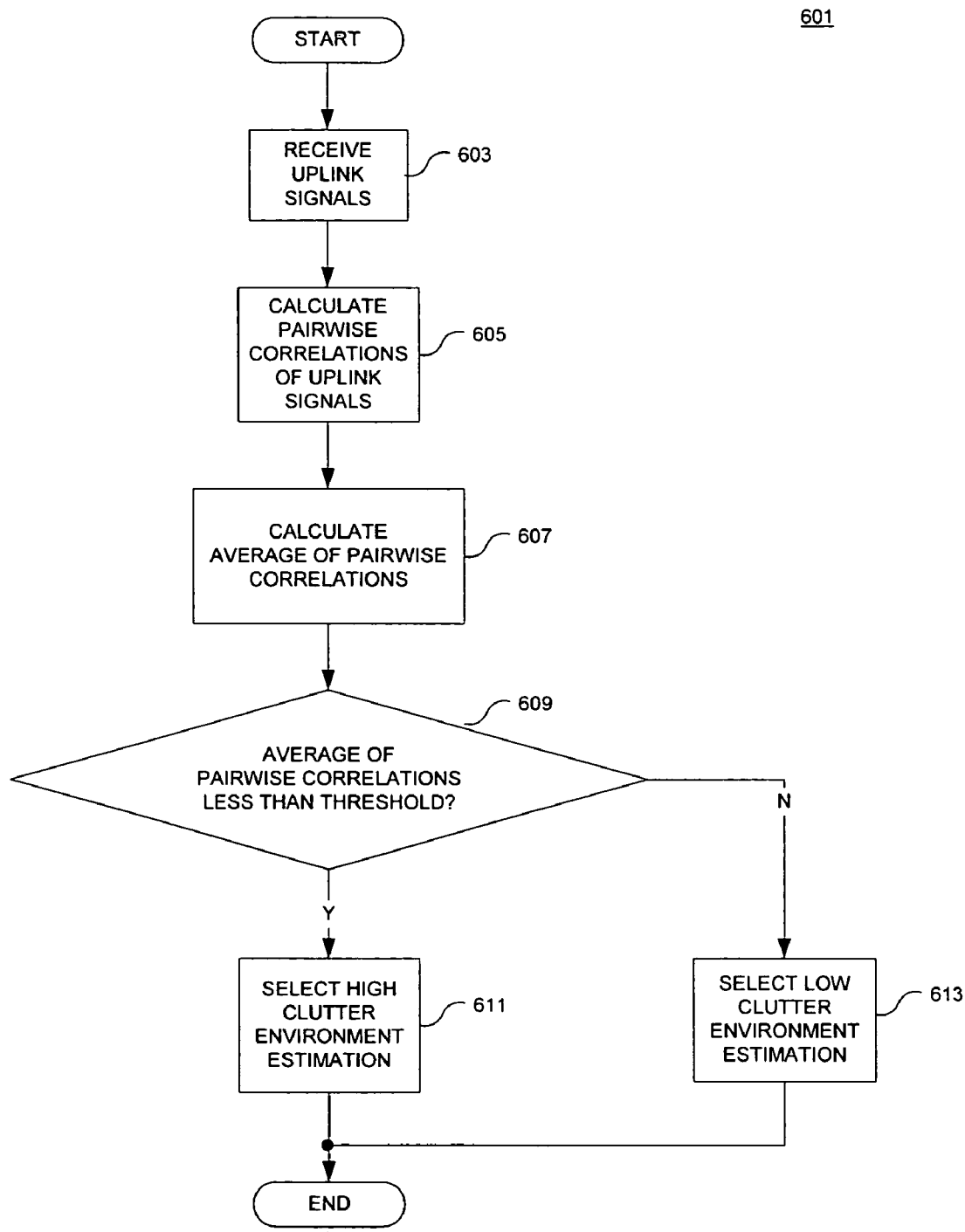
FIG. 6 is a flow diagram illustrating another embodiment of a method for identifying a low or high clutter environment in accordance with the teachings of the present invention.

FIG. 6 is a flow diagram 601 illustration of another embodiment of a method for identifying a low or high clutter environment in accordance with the teachings of the present invention. As shown in block 603, uplink signals are received by for example base station 101 in accordance with the teachings of one embodiment of the present invention. Block 605 shows that pairwise correlations of the uplink signals are then calculated. To illustrate, assume that Z is the matrix representing the received uplink signal and that $Z = [Z_1\ Z_2 \ldots Z_M]$, and that $Z_1$ corresponds to the received uplink signals at the first antenna element, $Z_2$ corresponds to the received uplink signals at the second antenna element, . . . and that $Z_M$ corresponds to the received uplink signals at the Mth antenna element. In one embodiment, pairwise correlations are determined by calculating the normalized dot product for of the pairwise correlations. Accordingly, pairwise correlations may be calculated according to the following relationship:

$$\rho_{i,j} = \langle Z_i^H Z_j \rangle / (\|Z_i^H\| \|Z_j\|) \quad \text{(Eq. 14)}$$

where i and j represent specific antenna elements in the antenna array and $i \neq j$. In one embodiment, correlations are calculated for all pairs of uplink signals.

Figure 7:
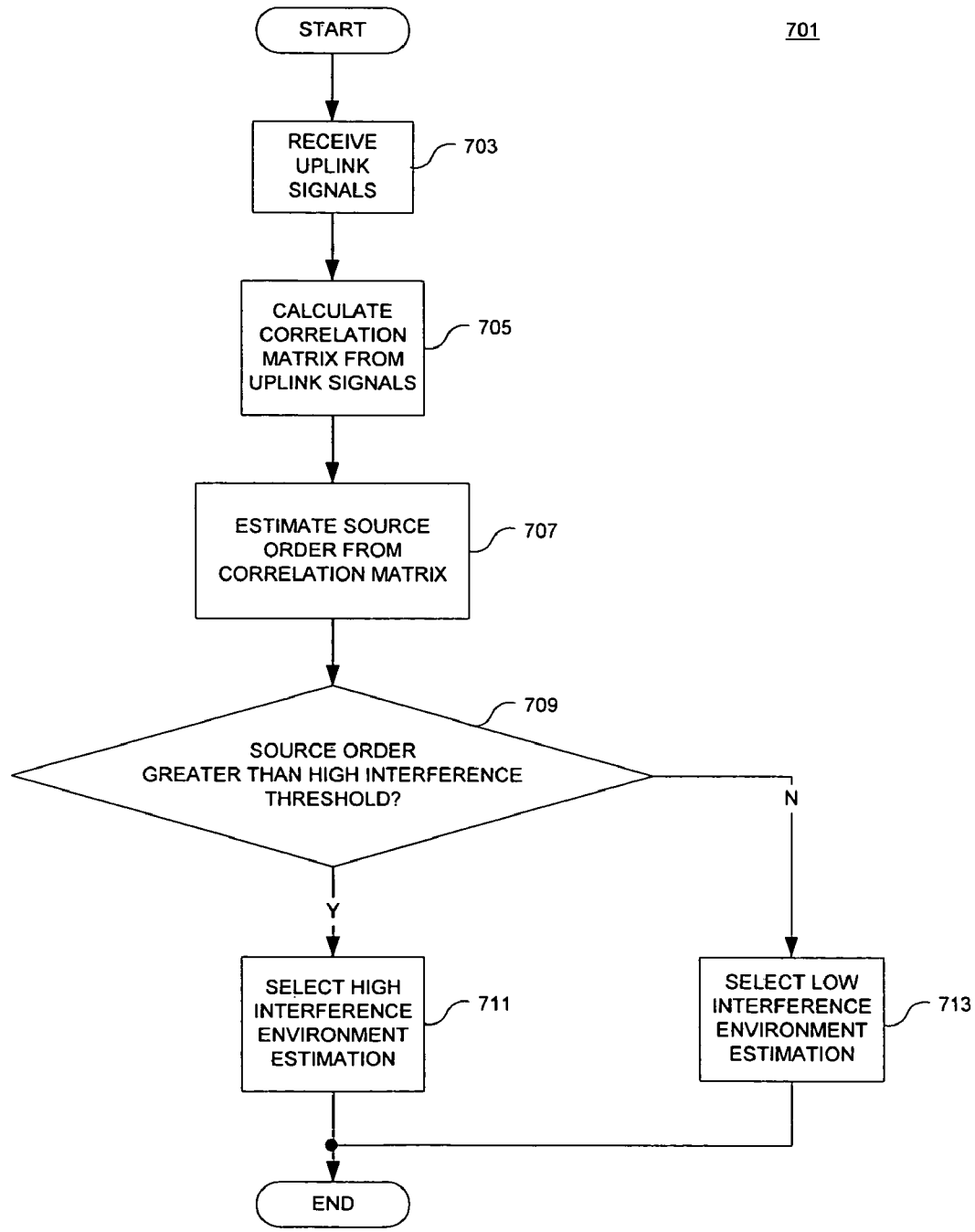
FIG. 7 is a flow diagram illustrating one embodiment of a method for identifying a low or high interference environment in accordance with the teachings of the present invention.

Continuing with the flow diagram 601 of FIG. 6, block 607 shows that in one embodiment, the average of the pairwise correlations is then calculated. In one embodiment, the average of the absolute values of all pairwise correlations is calculated. Block 609 shows that the average of the pairwise correlations is then compared with a high clutter threshold. If the average is less than the high clutter threshold, then a high clutter environment estimation is selected, as shown in FIG. 6 with block 611. Otherwise, a low clutter environment estimation is selected, as shown in FIG. 6 with block 613. It is appreciated that the high clutter threshold is determined in one embodiment based on a number of factors including the number of antenna elements M in the antenna array. FIG. 7 is a flow diagram 701 illustration of one embodiment of a method for identifying a low or high interference environment in accordance with the teachings of the present invention. As shown in block 703, uplink signals are received by for example base station 101 in accordance with the teachings of one embodiment of the present invention. Block 705 shows that a correlation matrix $R_{ZZ}$ is then calculated from the uplink signals. To illustrate, assume that Z is the matrix representing the received uplink signals. In one embodiment, $R_{ZZ}$ is calculated according to the following relationship:

$$R_{ZZ} = ZZ^H \quad \text{(Eq. 15)}$$

Continuing with the flow diagram 701 of FIG. 7, block 707 shows that in one embodiment, the source order is then calculated from the correlation matrix $R_{ZZ}$. In one embodiment, the source order is an estimate of the number of users in the same frequency and time and is calculated by first determining Eigen values for $R_{ZZ}$. To illustrate, assume a simple example of the correlation matrix:

$$R_{ZZ} = \begin{bmatrix} 1 & 0 & 0 \\ 0 & 1 & 0 \\ 0 & 0 & 0 \end{bmatrix} \quad \text{(Eq. 16)}$$

In this simple example, M=3 antennas and the Eigen values for $R_{ZZ} = [1\ 1\ 0]$.

In one embodiment, after the Eigen values for $R_{ZZ}$ are determined, the source order may be determined using well-known techniques including for example Sequential Hypothesis (SH), Minimum Descriptive Length (MDL), Akaike Information Criteria (AIC) or the like. As is known to those skilled in the art, all these techniques estimate then source order or number of sources by minimizing a log-likelihood function, where the likelihood function is the ratio of geometric mean to arithmetic mean of the Eigen values of the input correlation matrix.

Continuing with the flow diagram 701 of FIG. 7, block 709 shows that in one embodiment, the estimated source order is then compared to a high interference threshold. If the estimated source order is greater than the high interference threshold, which in one embodiment is equal one, then a high interference environment estimation is selected, as shown in FIG. 7 with block 711. Otherwise, a low interference environment estimation is selected, as shown in FIG. 7 with block 713.

Figure 8:
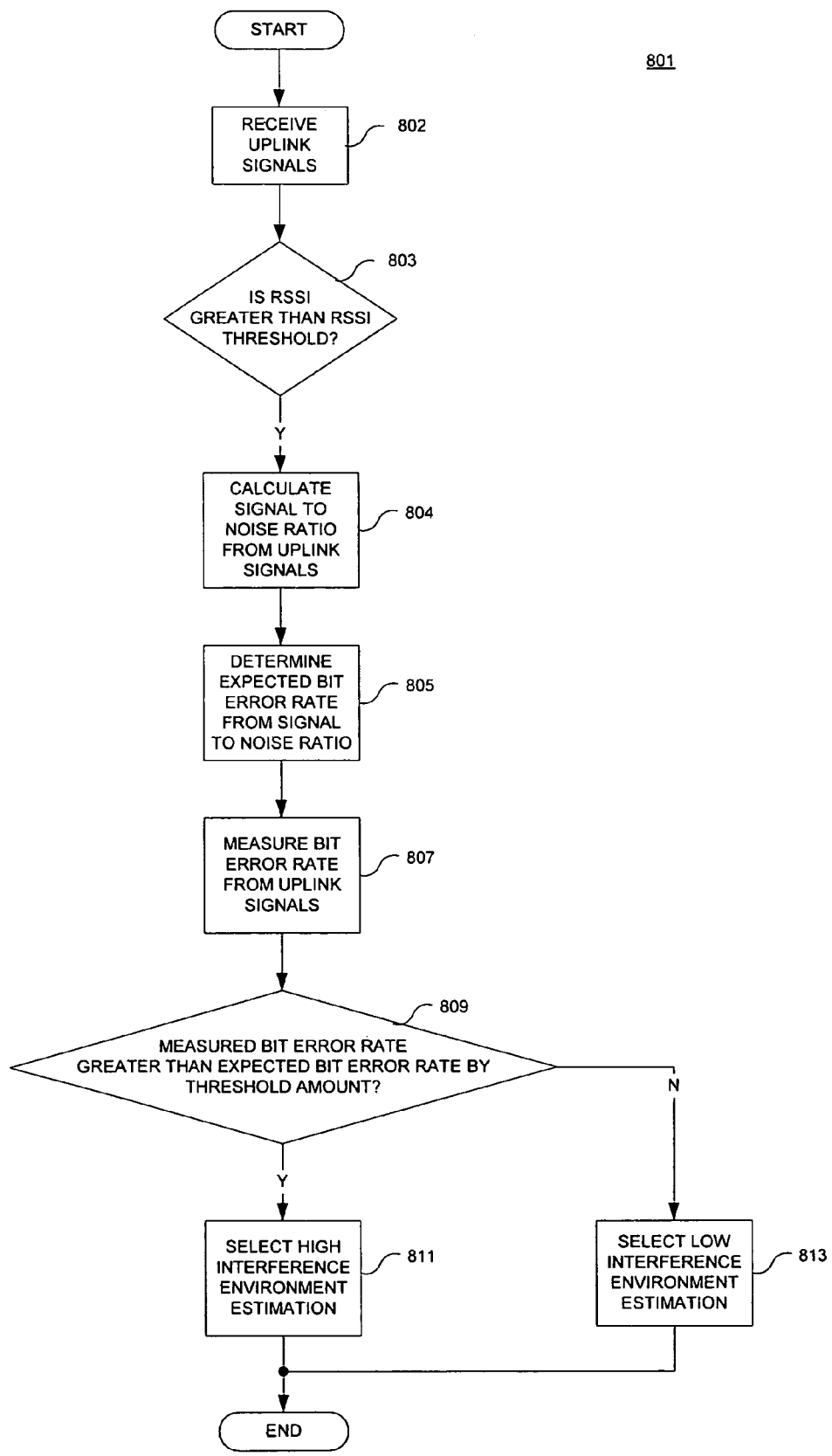
FIG. 8 is a flow diagram illustrating another embodiment of a method for identifying a low or high interference environment in accordance with the teachings of the present invention.

FIG. 8 is a flow diagram 801 illustration of another embodiment of a method for identifying a low or high interference environment in accordance with the teachings of the present invention. As shown in block 802, uplink signals are received by for example base station 101 in accordance with the teachings of one embodiment of the present invention.

After the uplink communication signals are received, a received signal strength indication (RSSI) of the uplink communications signals is then measured. The RSSI includes the components of S, N and I, where S represents the desired signal, N represents noise and I represents interference. If the RSSI is greater than an RSSI threshold, as shown in block 803, block 804 shows that in one embodiment, the signal to noise ratio is then calculated from the uplink communication signals. When a signal S is not being transmitted and/or received, the noise N can then be measured from the uplink communication signals. The signal to noise ratio is calculated using the following relationship:

$$\text{signal to noise ratio} = RSSI/N \qquad (Eq.\ 17)$$

After the signal to noise ratio is calculated, block 805 shows that an expected bit error rate (BER) can then be determined in accordance with the teachings of the present invention. In one embodiment, the expected BER is determined based on values predicted in advance that may for example be stored in look-up tables or the like. In particular, for a given signal to noise ratio, an expected BER can be determined. In another embodiment, the expected BER is a function of the signal to noise ratio and can therefore be derived from the signal to noise ratio.

Continuing with flow chart 801 of FIG. 8, block 807 shows the BER is also measured from the received uplink communication signals in one embodiment of the present invention. Block 809 shows that in one embodiment, the measured BER is then compared to the expected BER. In one embodiment, if the measured BER is greater than the expected BER by a BER threshold amount, then a high interference environment estimation is selected, as shown in FIG. 8 with block 811. Otherwise, a low interference environment estimation is selected, as shown in FIG. 8 with block 813.

In the foregoing detailed description, including what is described in the Abstract, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

The terms used in the following claims should not be construed to limit the invention to the specific embodiments disclosed in the specification. Rather, the scope of the invention is to be determined entirely by the following claims, which are to be construed in accordance with the established doctrines of claim interpretation.

What is claimed is:

1. A method of characterizing an environment, comprising:
   receiving uplink signals from a plurality of antenna array elements;
   estimating an uplink spatial signature of the received uplink signals;
   calculating a geometric uplink spatial signature of the received uplink signals;
   finding a correlation between the estimated uplink spatial signature and the geometric uplink spatial signature; and
   selecting a low clutter environment estimation if the correlation between the estimated uplink spatial signature and the geometric uplink spatial signature is greater than a low clutter threshold.

2. The method of claim 1 wherein calculating the geometric uplink spatial signature comprises:
   estimating a dominant angle of arrival of the uplink signals received by the plurality of antenna array elements;
   calculating an uplink spatial signature of the received uplink signals using the estimated dominant angle of arrival.

3. The method of claim 1, wherein finding the correlation between the estimated uplink spatial signature and the geometric uplink spatial signature comprises calculating a normalized dot product of the estimated uplink spatial signature and the geometric uplink spatial signature.

4. The method of claim 1 wherein estimating the uplink spatial signature of the received uplink signals comprises calculating a correlation vector between the uplink signals received by the plurality of antenna array elements and a reference signal.

5. The method of claim 1 wherein the uplink signals are included in a spatial division multiple access (SDMA) communications system.

6. The method of claim 1 wherein the uplink signals are included in a time division duplex (TDD) communications system.

7. The method of claim 1 wherein the uplink signals are included in a frequency division duplex (FDD) communications system.

8. The method of claim 1 wherein the uplink signals are received by the plurality of antenna array elements from one or more remote terminals.

9. An apparatus, comprising:
   a plurality of antenna elements;
   a receiver coupled to receive uplink signals from the plurality of antenna elements; and
   a signal processor coupled to the receiver, the signal processor to select an estimation of an environment responsive to the uplink signals received by the plurality of antenna elements, wherein the signal processor is to select a low clutter environment estimation if a correlation between an estimated uplink spatial signature and a geometric uplink spatial signature is greater than a low clutter estimation threshold.

10. The apparatus of claim 9 further comprising a memory coupled to the receive and the signal processor to store uplink signals received from the plurality of antenna elements.

11. The apparatus of claim 9 wherein the signal processor is coupled to calculate the geometric uplink spatial signature responsive to a dominant angle of arrival estimated by the signal processor responsive to the uplink signals received from the plurality of antenna elements.

12. The method of claim 9, wherein the plurality of antenna elements comprise a handset.

13. A tangible machine-readable medium having stored thereon instructions, which when executed cause:
   receiving uplink signals from a plurality of antenna array elements;
   storing the uplink signals received from the plurality of antenna array elements;
   estimating an uplink spatial signature responsive to the uplink signals received from the plurality of antenna array elements;
   estimating a dominant angle of arrival responsive to the uplink signals received from the plurality of antenna array elements;
   calculating a geometric uplink spatial signature responsive to the uplink signals received from the plurality of antenna array elements and the estimated dominant angle of arrival;
   finding a correlation between the estimated uplink spatial signature and the geometric spatial signature; and
   selecting a low clutter environment estimation if the correlation between the estimated uplink spatial signature and the geometric spatial signature is greater than a low clutter threshold.

14. The tangible machine-readable medium of claim 13 wherein finding the correlation between the estimated uplink spatial signature and the geometric spatial signature comprises calculating a normalized dot product between the estimated uplink spatial signature and the geometric spatial signature.

15. A method of characterizing an environment, comprising:
   receiving uplink signals from a plurality of antenna array elements; and
   estimating an uplink spatial signature from the received uplink signals;
   calculating a geometric uplink spatial signature from the received uplink signals;
   finding a correlation between the estimated uplink spatial signature and the geometric uplink spatial signature; and
   selecting a low clutter environment if the correlation between the estimated uplink spatial signature and the geometric uplink spatial signature is greater than a low clutter threshold.

* * * * *